United States Patent Office 3,352,225
Patented Nov. 14, 1967

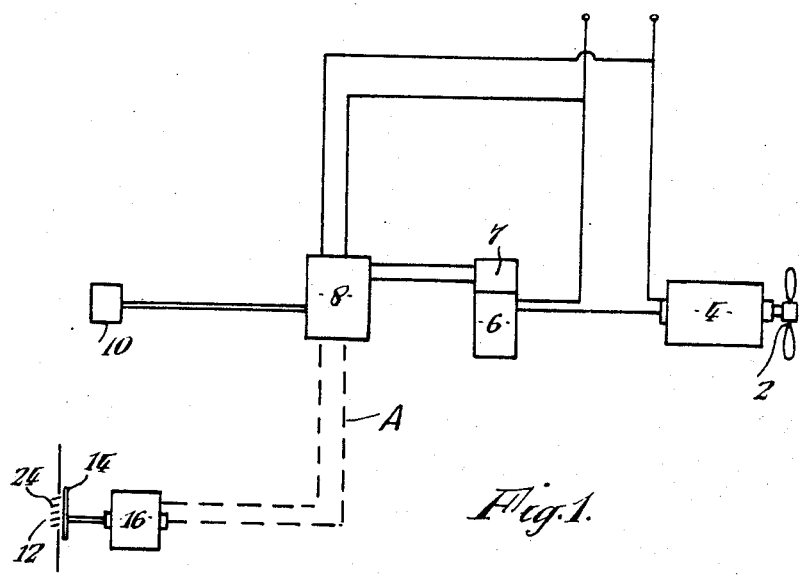
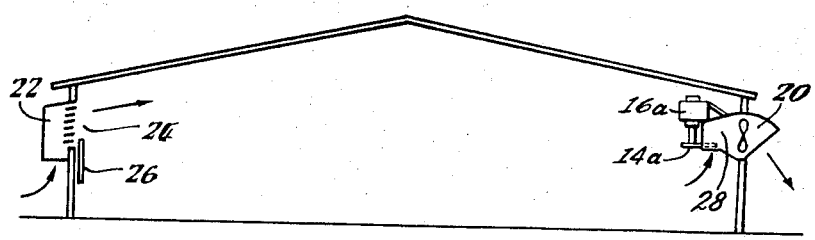
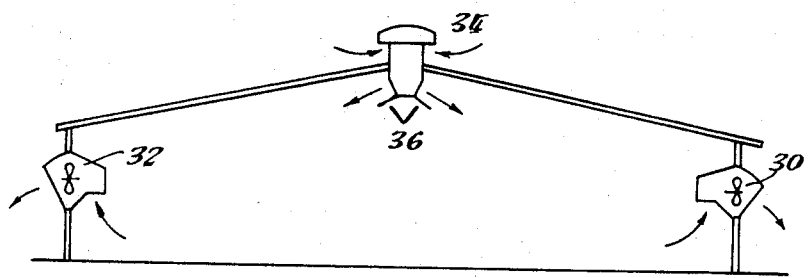

3,352,225
VENTILATION APPARATUS WITH
CONTROL MEANS
Gerald Drandridge ffiske, Dinton, Salisbury, England, assignor to Stockbuildings Limited, Salisbury, England, a company of Great Britain and Northern Ireland
Filed Nov. 23, 1965, Ser. No. 509,273
Claims priority, application Great Britain,
Nov. 25, 1964, 47,924/64
8 Claims. (Cl. 98—33)

ABSTRACT OF THE DISCLOSURE

The specification describes a forced draft ventilation arrangement intended particularly for livestock buildings and in which the air extraction rate is made dependent upon the temperature in the building and the aperture size at the fan outlets and/or at remote air inlets, is simultaneously varied so as to reduce variations in the flow speed of the ventilating air currents.

---

This invention relates to ventilation apparatus and is particularly concerned with apparatus used in ventilating livestock buildings.

In such buildings it is important that the air temperature is maintained at a reasonably constant value. Ventilation means to control the speeed of the fan in an infinitely of extractor fans along the length of the building, air being drawn into the building through vents either in the walls or in the roof ridge. In order to control temperature variations, manual throttling means have been employed to limit the air flow and it is known to arrange that one or more of the fans can be switched off in response to the operation of a thermosensitive unit.

According to the present invention, there is provided ventilation apparatus comprising an electric fan and speed control means for the fan comprising voltage regulation means in the power supply thereto, a thermosensitive element being arranged to operate said voltage regulation means to control the speed of the fan in an infinitely variable manner in dependence upon the temperature at said element. More particularly, the control means may be adjustable by means of a servomotor arranged to receive a power supply through a reversing switch actuable by the thermosensitive element.

In addition to the control of the temperature of the air within a livestock building that may be effected by apparatus according to the invention, it is desirable to ensure as uniform an air flow as possible with a view both to the prevention of draughts and to the adequate ventilation, for example, of litter on the floor of the building. To the extent that the operation of a series of fans according to the invention along the length of the building will give a relatively uniform extraction flow this condition may now be achieved but preferably the invention may also provide means to act in combination with the control of the extraction rates of the fans so as to ensure that the speed of the replacement air drawn into the building is kept relatively constant.

Such means can comprise an air inlet vent having an adjustable shutter, the shutter being movable by a servomotor operable by the reversing switch connected to the fan control means servomotor.

The invention will now be more particularly described with reference to the accompanying drawings wherein:

FIG. 1 is a diagrammatic layout of one form of ventilation apparatus according to the present invention and FIGS. 2 and 3 are diagrammatic cross-sections of two livestock buildings showing alternative arrangements for the incorporation of the ventilation apparatus illustrated in FIG. 1.

Referring to FIG. 1 of the drawing, an extractor fan 2 is powered by a motor 4 in series with which is a control device 6 the setting of which can be adjusted by a servomotor 7. While the connections illustrated for the device 6 are such as would be provided if that device were in the form of a rheostat, it will be appreciated that other voltage control means, such as an autotransformer can be used instead, the circuit changes required for such a modification being too well known to need explicit exemplification. The servomotor can be of the rotary type to actuate an adjustment slide (not shown) of the device through reduction gearing. A switch 8 provided in the power supply to the servomotor is operated by a thermosensitive device 10 which may comprise a pressure-sensitive mercury-filled element. The switch is able to reverse the power connections to the servomotor so as to run the servomotor in opposite directions. It also has an intermediate neutral position in which no power flows to the servomotor.

In operation, if the switch 8 is in the neutral position, the control device setting will be held constant and the fan will run at a constant speed. However, if the air temperature in the building rises above a predetermined value the thermosensitive element will operate to move the switch so as to energise the servomotor 7, which runs so that the voltage-reducing effect of the device 6 on the fan motor is lessened. The fan speed will increase and more air is drawn through the building. The air temperature will then fall until the thermosensitive element again operates to move the switch 8 to the neutral position and the fan speed will be held constant at its new rate.

If the temperature falls below the predetermined level the thermosensitive element will operate the switch so that it now actuates the servomotor in the reverse direction to increase the voltage-reducing effect of the device 6, thus lowering the fan speed, and less air is drawn into the building. The air temperature will then rise until the thermosensitive element again operates to move the switch 8 to the neutral position and the fan speed will be held constant at its new rate. If the adjustment slide of the device 6 reaches the end of its travel before the switch 8 has operated either to cut out the servomotor or to reverse its direction of rotation, an overtravel switch (not shown) will act to stop the servomotor.

The apparatus shown in FIG. 1 also comprises means to ensure that, as the fan speed changes the effective area of louvered inlet vent 12 also changes to maintain the inlet air velocity at a reasonably constant figure. Mounted adjacent the vent 12 is a shutter 14 operated by a servomotor 16. The motor 16 is connected to the switch 8 by a line A in the same manner as the servomotor 7 of the device 6. Thus, similarly to the servomotor 7, if the switch 8 is in the neutral position, the servomotor 16 is inoperative and the inlet area of the vent remains constant. However, if the air temperature in the building increases, as the fan speed is increased the action of the switch 8 will also make the servomotor 16 operative to move the shutter 14 so as to increase the inlet area of the vent. Conversely, as the air temperature falls and the fan speed is reduced, the motor 16 will operate to reduce the inlet area of the vent.

FIG. 2 shows one installation arangement of the ventilation apparatus in a livestock building. The figure shows one of a spaced series of extractor fans 20 mounted along one wall of the building and one of a spaced series of inlet vents 22 mounted along the opposite wall. Cowls are arranged at the vents and the fans and the inlet vents are provided with louvres 24 so that the incoming air can be directed at the required angle to achieve a proper air circulation. Each vent has a shutter 26 which can be adjusted by the inlet servomotor to alter the effective throughflow area. Similarly, each fan cowl has a shutter 14a at its inlet controlled by a servomotor 16a mounted on the cowl, the control arrangement here being directly analogous to the shutter 14 and servomotor 16 in FIG. 1.

The servomotor operating the shutter 26 will be mounted adjacent the shutter so as to allow a convenient mechanical interconnection to be made. The thermosensitive element can be placed within the fan cowling at a position such as 28 although other locations are possible; the switch the element operates will conveniently be close to it. The remaining parts of the control system may be installed in a remote position if desired. It is possible to arrange that the shutters of the row of inlet vents and the row of fans are respectively interconnected so that the two servomotors shown in FIG. 1 control the air inlet shutters and the extractor fans of the complete building.

An alternative installation is shown in FIG. 3 where two series of extractor fans 30 and 32 are mounted along opposite walls of the building and a single series of roof vents 34 is mounted along the roof ridge. Each vent has two opposed flaps 36 which can be angularly adjusted to alter the effective inlet area and, of course, the inlet control servomotor now dictates the angular positions of the flaps. In an example such as this there need only be one thermosensitive element mounted adjacent one of the two opposed motors, the other motor acting as a slave and the two flaps 36 being maintained at equal and opposite inclinations.

Other installation arrangements can be employed with apparatus according to the invention: in analogy to FIG. 3, a single row of fans can be placed in the roof ridge and two series of inlet vents will then be placed in the opposed side walls of the building. Moreover, it may be found in particular cases that the thermosensitive element is best placed adjacent an inlet vent.

As regards the velocity control effected by the use of a movable shutter it is possible to arrange such a control in the region of the fan cowling additionally or alternatively to the control at the inlet vent.

What I claim and desire to secure by Letters Patent is:

1. In a building or other enclosed space, the improved ventilation means consisting of at least one fan at a forced draft aperture between the interior and the exterior of said building and a throughflow vent between said interior and exterior but remote from the forced draft aperture whereby the vent and aperture form spaced openings for a flow of ventilation air through said building, an electrical power input to said fan and means for controlling the speed of the fan, said control means including power regulation means to control the speed of the fan in an infinitely variable manner in dependence upon the temperature at said element, there being further provided a throttle device at said throughflow vent and an adjustment device connected to said throttle device to vary the effective area at said vent, control means operatively connected to said adjustment device to cause said area to vary together with and in the same sense as said fan speed.

2. Ventilation means according to claim 1 characterised in that opposite side walls of the enclosed space have arranged upon them the fan and the throughflow vent.

3. Ventilation means according to claim 1 characterised in that opposite side walls of the enclosed space have respective fans arranged upon them and a roof or ceiling between said side walls carries the throughflow vent centrally of said side walls.

4. Ventilation means according to claim 1 characterised in that said vent defines an air inlet and said fan forms an air extractor for the enclosed space.

5. In a building or other enclosed space, the improved ventilation means consisting of a series of fans spaced along the building at respective forced draft passages between the interior and the exterior thereof and a series of throughflow passages between the interior and the exterior of the building but remote from the forced draft passage entries whereby said two series of passages form inlet and outlet openings for a flow of ventilating air through the building, and electrical power input to said fans and means for controlling the speed of the fans in unison, said control means including voltage reduction means in the power input to said fans, a thermosensitive element within the building and servomotor means for said voltage reduction means, an actuating power supply to said servomotor means and reversing switch means in said actuating supply being operable by the thermosensitive element to determine the movement of the servomotor means in order to control the setting of the voltage regulation means and through said regulation means the speed of the fans in an infinitely variable manner.

6. Ventilation means comprising, in combination, a fan, an electrical power input thereto and means for controlling the fan speed, said means including a power regulation device connected to said input and a thermosensitive element connected to said device to govern the setting of the device in order to control the speed of the fan in an infinitely variable manner in dependence upon the temperature at said element, a cowling shrouding the fan having a shutter adjustably mounted thereon, servomotor means mounted on the cowling to control the opening adjustment of said shutter, connection means between said servomotor means and said fan speed control means whereby the shutter opening is controlled together with the control of the fan speed.

7. Ventilation apparatus comprising, in combination, a fan, an electrical power input thereto and means for controlling the fan speed, said means including a power regulation device connected to said fan power input and a thermosensitive element connected to said device to govern the setting of the device in order to control the speed of the fan in an infinitely variable manner in dependence upon the temperature at said element, a throughflow duct discrete from said fan whereby said duct and said fan are able to form mutually remotely spaced inlet and exit apertures for an enclosed space, a shutter being adjustably mounted on said duct to determine the throughflow area of the duct, a servomotor controlling said shutter opening, said servomotor being operable from said thermosensitive element whereby said duct area is varied together with and in the same sense as the fan speed.

8. In a building, ventilation apparatus comprising, in combination, a fan, an electrical power input thereto, a throughflow duct, said duct and said fan being mounted at mutually remote boundaries of the space enclosed by the building, means for controlling the fan speed, said means including a voltage regulation device connected to said fan power input and a thermosensitive element located within the building, a servomotor for said voltage regulation device, an actuating circuit to said servomotor and a reversing switch disposed in said circuit being operable by the thermosensitive element to determine the movement of the servomotor in order to control the setting of the voltage regulation device in an infinitely variable manner in dependence upon the relationship between the temperature sensed by said thermosensitive element and a predetermined temperature value, a throttle device being arranged on said throughflow duct, said throttle device being connected to an adjustment device to vary the effective area of the duct, means being provided to actuate said adjustment device and cause said area to vary in dependence upon and in the same sense as the variation of fan speed.

References Cited

UNITED STATES PATENTS

| | | |
|---|---|---|
| 1,919,743 | 7/1933 | Peters. |
| 2,091,563 | 8/1937 | Palmer _____ 62—186 X |
| 2,189,895 | 2/1940 | Grutzner. |
| 2,296,530 | 9/1942 | McGrath _____ 62—178 X |

MEYER PERLIN, *Primary Examiner.*